US008233549B2

(12) United States Patent
Toyama (10) Patent No.: US 8,233,549 B2
(45) Date of Patent: Jul. 31, 2012

(54) VIDEO RECEIVING APPARATUS AND VIDEO RECEIVING METHOD TO ADDRESS ERROR IN RECEIVED VIDEO

(75) Inventor: Takeshi Toyama, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 12/510,007

(22) Filed: Jul. 27, 2009

(65) Prior Publication Data
US 2010/0031307 A1  Feb. 4, 2010

(30) Foreign Application Priority Data

Jul. 29, 2008  (JP) ................................ 2008-195433

(51) Int. Cl.
| | |
|---|---|
| H04N 11/02 | (2006.01) |
| G06F 11/00 | (2006.01) |
| G06F 15/16 | (2006.01) |
| H03M 13/00 | (2006.01) |
| H03M 13/03 | (2006.01) |
| G08C 25/00 | (2006.01) |
| H04N 7/173 | (2011.01) |
| H04N 5/931 | (2006.01) |
| H04N 5/94 | (2006.01) |

(52) U.S. Cl. ......... 375/240.27; 375/240.01; 375/240.28; 714/707; 714/776; 714/789; 714/799; 725/131; 386/207; 386/263; 709/248

(58) Field of Classification Search ............. 375/240.27, 375/240.01, 240.28; 714/707, 776, 789, 714/799; 725/131; 386/207, 263; 709/248
See application file for complete search history.

(56) References Cited

U.S. PATENT DOCUMENTS

| | | | |
|---|---|---|---|
| RE38,871 E * | 11/2005 | Sekiguchi et al. | 714/752 |
| 7,636,298 B2 * | 12/2009 | Miura et al. | 370/216 |
| 2003/0021346 A1* | 1/2003 | Bixby et al. | 375/240.25 |
| 2005/0111371 A1 | 5/2005 | Miura et al. | |
| 2008/0273554 A1* | 11/2008 | Shao et al. | 370/498 |
| 2008/0279532 A1* | 11/2008 | Shimazaki et al. | 386/94 |

FOREIGN PATENT DOCUMENTS

| | | | |
|---|---|---|---|
| JP | 2005-159433 A | 6/2005 | |
| JP | 2005-303783 A | 10/2005 | |

* cited by examiner

*Primary Examiner* — Hoang-Vu A Nguyen-Ba
(74) *Attorney, Agent, or Firm* — Canon USA, Inc., IP Division

(57) ABSTRACT

A video receiving apparatus includes a receiving unit, a detecting unit, a determining unit, and a control unit. The receiving unit receives a video stream transmitted from a video distribution apparatus and to be reproduced by a video reproducing unit. The detecting unit detects an error occurrence position on the video stream in response to an error occurring during receiving of the video stream. The determining unit determines a reproduction start time based on the error occurrence position detected by the detecting unit and a position of a predetermined synchronization code in the video stream so that reproduction of the video stream is started before the error occurrence position. The control unit transmits a reproduction request including the determined reproduction start time to the video distribution apparatus.

11 Claims, 7 Drawing Sheets

VIDEO RECEIVING APPARATUS AND VIDEO RECEIVING METHOD TO ADDRESS ERROR IN RECEIVED VIDEO

BACKGROUND OF THE INVENTION

1. Field of the Invention

The present invention relates to a video receiving apparatus and a video receiving method, and more particularly, to a technique for receiving a distributed video transmitted via a network.

2. Description of the Related Art

In recent years, development of a video compression technique and popularization of a high-speed network has allowed video distribution services via a network to spread. The video distribution services can be classified into a broadcasting type, a video-on-demand type, and a download type. The video distribution service of the video-on-demand type enables a viewer to select her/his desired contents when she/he wants to view the contents. Thus, the video-on-demand type video distribution service is good in convenience and is expected to be popular in the future.

The video distribution service requires immediacy, so that a real-time transport protocol (RTP) is employed as a distribution protocol, and a user datagram protocol (UDP) is employed as a lower-layer protocol of the RTP.

Since the RTP and the UDP do not have a retransmission function for a transmission error such as a packet loss, an error correction technique referred to as forward error correction (FEC) is employed as an anti-transmission-error measure.

Conventionally, various techniques are discussed for employing the error correction technique. For example, Japanese Patent Application Laid-Open No. 2005-159433 discusses a packet error correction apparatus which controls transmission timing of a retransmission request in occurrence of a packet loss and can reproduce a video and sound at optimum delay time while reducing transmission of an unnecessary retransmission request.

Japanese Patent Application Laid-Open No. 2005-303783 discusses flow control according to a state of a receiving buffer by using a real-time streaming protocol (RTSP) method. Further, a stream reproducing method is discussed in which when an amount of data exceeds an upper limit of the receiving buffer, reproduction is temporarily stopped by PAUSE, and when the amount of data becomes equal to or smaller than a lower limit of the receiving buffer, the reproduction is resumed by PLAY.

However, since the FEC is less effective in a burst packet loss, it is difficult to reliably reduce a disturbance of reproduced video due to a transmission error. In particular, a viewer who purchases pay contents from the video distribution service of the video-on-demand type strongly requires to watch a stable reproduced video which is free from disturbance.

SUMMARY OF THE INVENTION

The present invention relates to a technique that can reduce inconvenience by disturbance of a reproduced video when a burst packet loss occurs.

According to an aspect of the present invention, a video receiving apparatus includes, a detecting unit configured to detect an error occurrence position on which an error occurs when a video stream received from a video distribution apparatus is supplied to a video reproducing unit to reproduce a video, a determining unit configured to determine reproduction start time based on a positional relationship between the detection position obtained by the detecting unit and a predetermined synchronization code in the video stream; and a control unit configured to designate the reproduction start time determined by the determining unit and to request the video distribution apparatus to transmit the video stream.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DETAILED DESCRIPTION OF THE EMBODIMENTS

Various exemplary embodiments, features, and aspects of the invention will be described in detail below with reference to the drawings.

Figure 1:
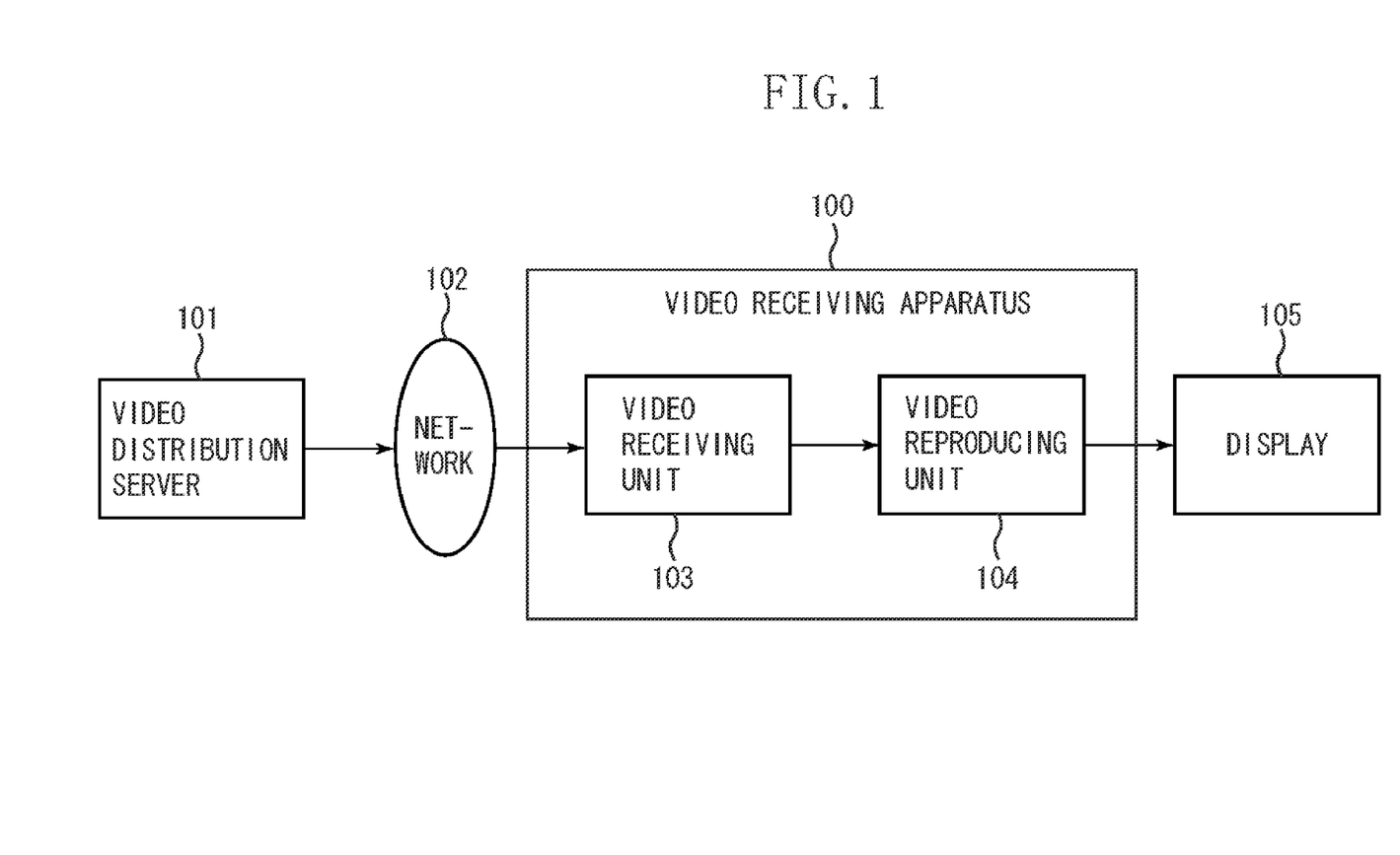
FIG. 1 is a block diagram illustrating a configuration of a video stream receiving system according to a first exemplary embodiment of the present invention.

FIG. 1 is a block diagram illustrating a configuration of a video stream receiving system according to a first exemplary embodiment of the present invention.

As illustrated in FIG. 1, a video receiving apparatus 100 receives a video stream from a video distribution server 101 via a network 102.

In the video receiving apparatus 100 according to the present exemplary embodiment, as a distribution protocol for a video stream, an RTP protocol is employed. As a lower-layer protocol of the RTP protocol, a UDP protocol is employed. The video receiving apparatus 100 does not include a protocol for error retransmission.

As a protocol which performs start and stop of a reproduction operation of a video stream and a special reproduction operation such as fast-forwarding, fast-rewinding, or temporary stopping, an RTSP protocol is employed. The video receiving apparatus 100 includes a video receiving unit 103 which receives a video stream transmitted from the video distribution server 101 and a video reproducing unit 104 which reproduces the received video stream and outputs the video stream to a display 105.

Figure 2:
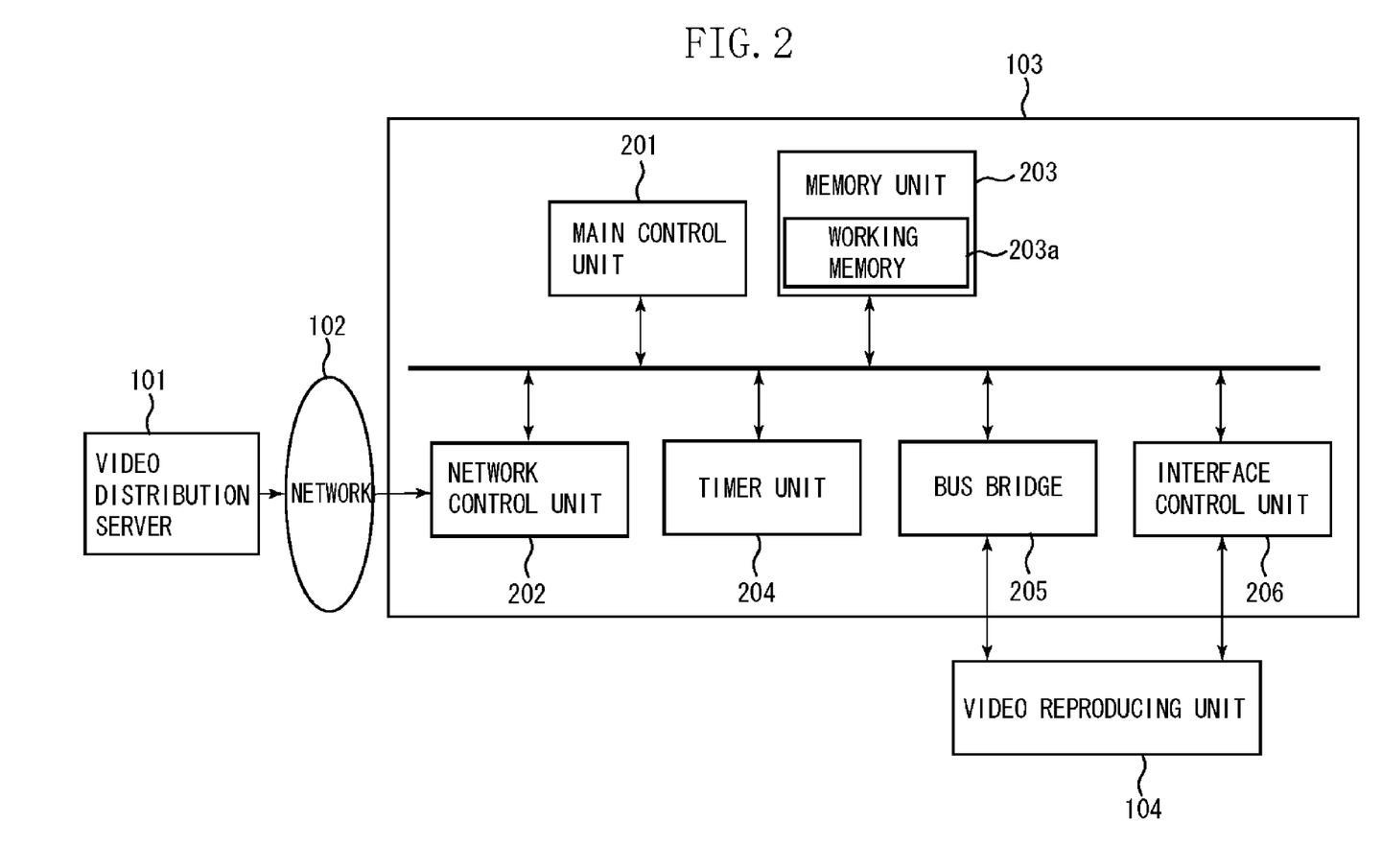
FIG. 2 is a block diagram illustrating a configuration of a video receiving unit according to the first exemplary embodiment of the present invention.

FIG. 2 illustrates the configuration of the video receiving unit 103 according to the first exemplary embodiment.

In FIG. 2, a main control unit 201 entirely controls the video receiving unit 103. A network control unit 202 receives a video stream transmitted from the video distribution server 101 by the RTP protocol and the RTSP protocol.

A memory unit 203 includes a receiving buffer for temporarily storing a received video stream. A timer unit 204 measures reproduction time of the video stream. A bus bridge 205 connects the memory unit 203 to the video reproducing unit 104. In this manner, the video reproducing unit 104 can access the memory unit 203 via the bus bridge 205. The video receiving unit 103 can exchange control information with the video reproducing unit 104 via an interface control unit 206.

Figure 3:
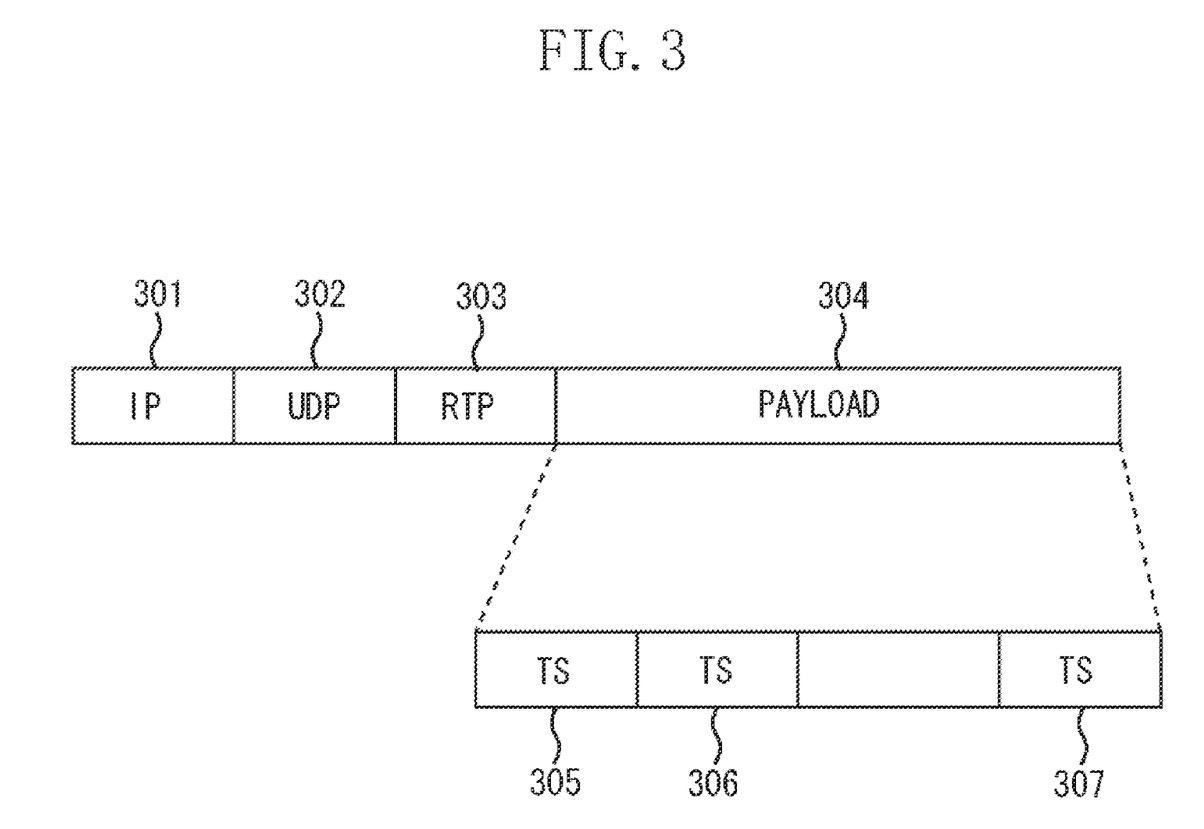
FIG. 3 illustrates an example of a transmission format of a video stream according to the first exemplary embodiment of the present invention.

FIG. 3 illustrates an example of a transmission format of a video stream according to the first exemplary embodiment.

The video stream transmitted from the video distribution server 101 is encoded by moving picture experts group (MPEG)-2 or H.264 and multiplexed in a format of a transport stream (TS) packet based on the MPEG-2 system standard.

TS-packetized video streams 305, 306, . . . , 307 are arranged in a payload 304. An RTP header 303, a UDP header 302, and an Internet protocol (IP) header 301 are added to the video streams to transmit the video streams as IP-packetized video streams.

Figure 4:
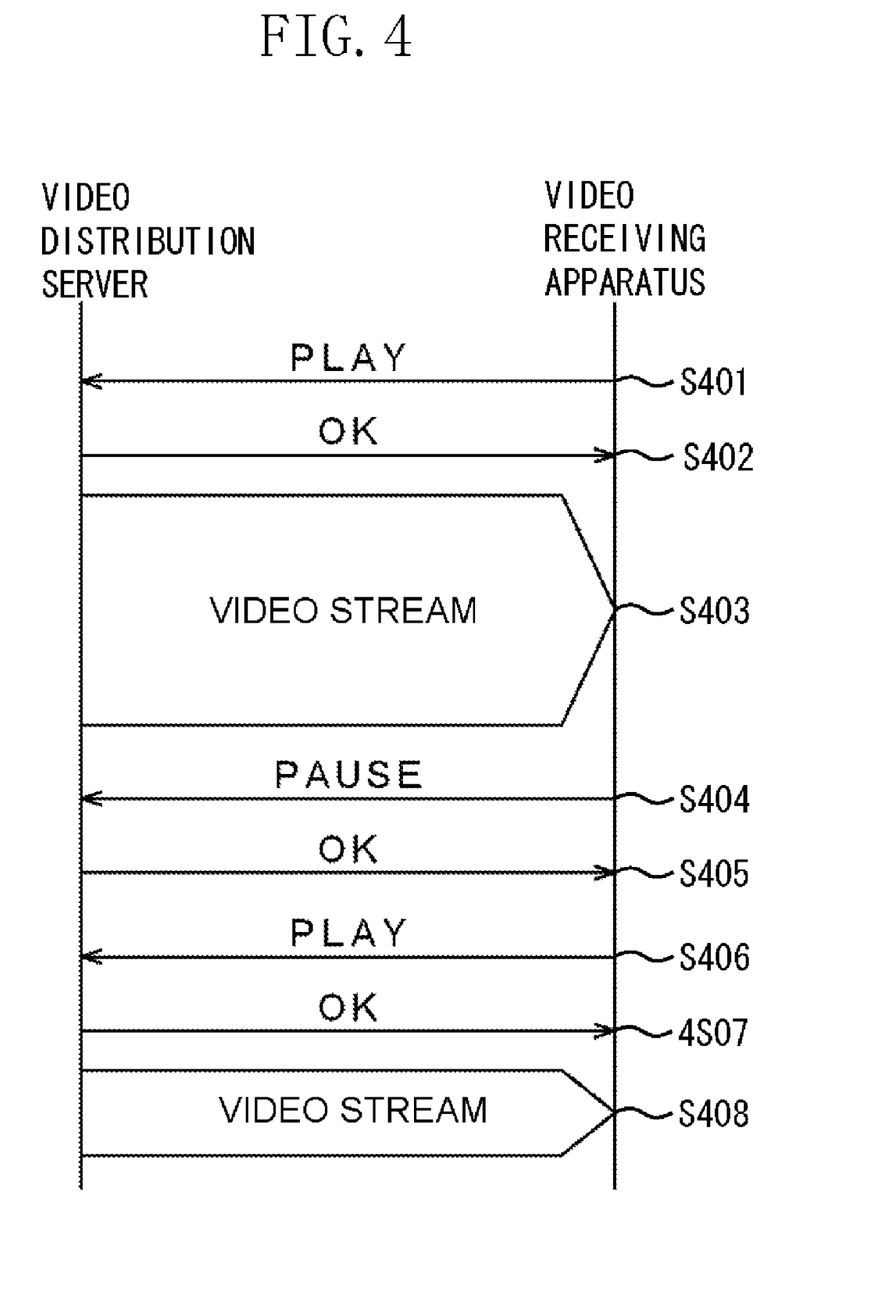
FIG. 4 illustrates an example of a transmission protocol sequence according to the first exemplary embodiment of the present invention.

FIG. 4 illustrates an example of a transmission protocol sequence to cause the video receiving apparatus 100 to receive a video stream transmitted from the video distribution server 101.

In this sequence, distribution of video streams is started from the head of video contents (steps S401 to S403). In the middle of the distribution, as one scheme of special reproduction, a video stream which is transmitted from a rewound stream position is distributed (steps S404 to S408).

In step S401, a PLAY command in the RTSP protocol is transmitted to the video distribution server 102. At this time, reproduction time of zero second is designated as a reproduction start position. In this case, the reproduction start position is designated by the reproduction time from the head of the video contents. When the head of the video contents is to be designated, the reproduction time of zero second may be designated.

In step S402, a response to the PLAY command is received from the video distribution server 101. In step S403, a video stream transmitted from the video distribution server 101 is received. Then, a special reproduction protocol sequence subsequent to step S404 is performed by a user operation.

In step S404, an example is illustrated in which a PAUSE command in the RTSP protocol is transmitted to the video distribution server 101. In step S405, a response to the PAUSE command is received from the video distribution server 101. In this case, the reproduction time when distribution is interrupted by the PAUSE command is described in the response.

When the reproduction time (reproduction time measured by the video distribution server 101) is different from reproduction time measured by the timer unit 204, the video receiving unit 103 adjusts both pieces of the reproduction time.

In step S406, the PLAY command is transmitted to the video distribution server 101. At this time, desired reproduction time is designated as a reproduction start position. In step S407, a response to the PLAY command is received from the video distribution server 101. In step S408, a video stream transmitted from a stream position corresponding to the reproduction time designated in step S406 is received.

An example of an FEC packet processing for recovering a lost RTP packet will be described below.

While the transmission protocol illustrated in FIG. 4 is performed, an FEC packet is separately transmitted between the video distribution server 101 and the video receiving apparatus 100.

Figure 5:
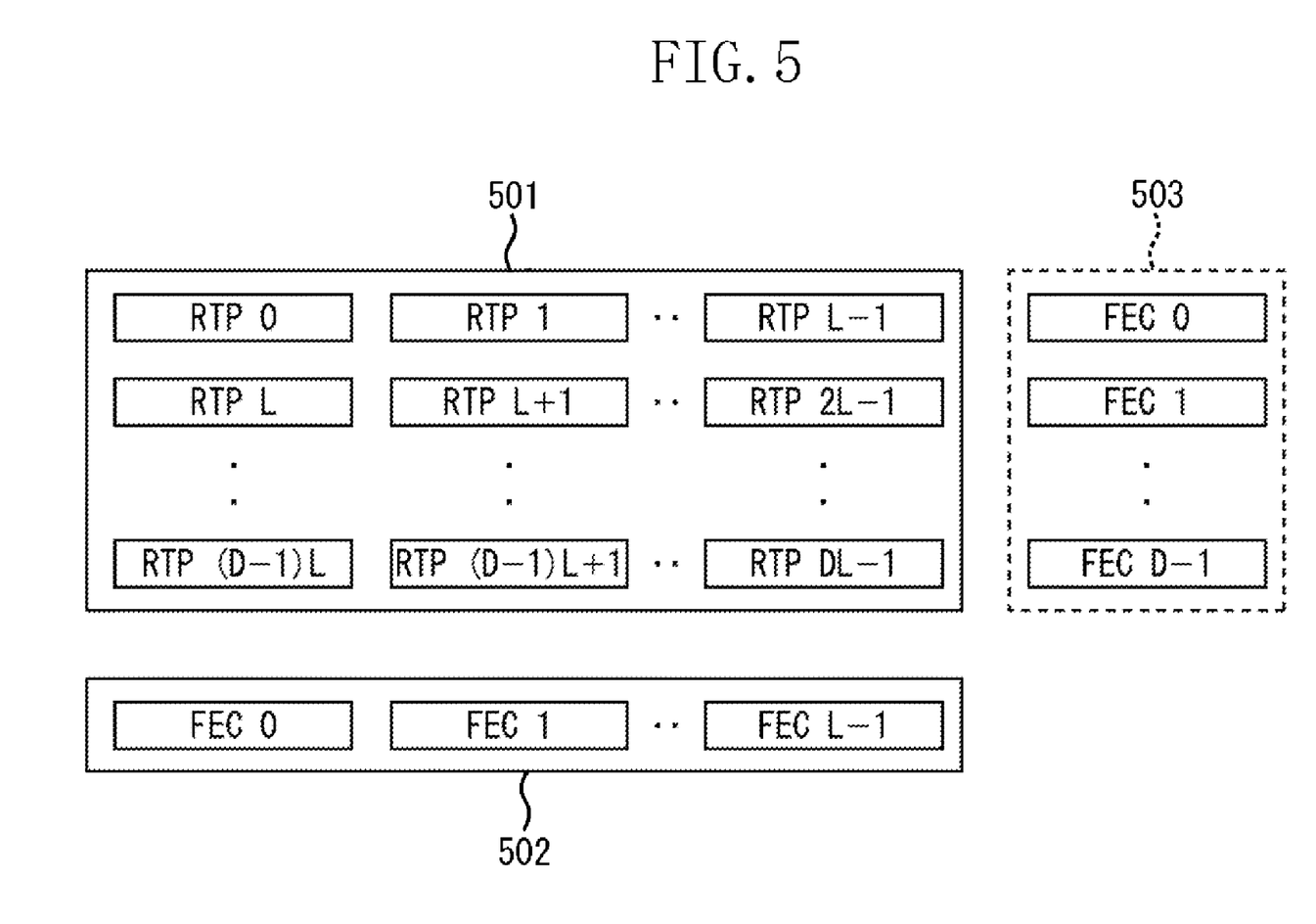
FIG. 5 illustrates an example of a relationship between an RTP packet and an FEC packet according to the first exemplary embodiment of the present invention.

FIG. 5 illustrates an example of a relationship between the RTP packet and the FEC packet.

In this example, for D×L pieces of RTP packets 501, L pieces of lateral FEC packets 502 and D pieces of vertical FEC packets 503 are transmitted from the video distribution server 101. In the following description, FEC processing is performed by using D×L pieces of the RTP packets 501 as a unit (to be referred to as an FEC processing unit hereinafter).

More specifically, the video receiving unit 103 performs error detection for D×L pieces of the RTP packets 501 by using any one of the lateral FEC packets 502 and the vertical FEC packets 503. When packet loss occurs, the lost packet is recovered by using the corresponding lateral FEC packets 502 or the corresponding vertical FEC packets 503.

When burst packet loss occurs, any other countermeasure may be required if a transmission error with which the FEC packet processing cannot cope occurs. As described above, since the video distribution server 101 transmits a video stream by the RTP/UDP protocol, the video distribution server 101 does not include an error retransmission function.

In the present exemplary embodiment, when a transmission error occurs, the special reproduction protocol sequence in steps S404 to S408 described with reference to FIG. 4 is performed. Reproducing is resumed from a video stream position that comes before the transmission error occurs to realize error retransmission.

More specifically, when the transmission error occurs, reproduction time is determined so that reproduction is started before the video stream position where the transmission error occurs. A PLAY command which designates the reproduction time is transmitted to the video distribution server 101.

An example of processing performed by the video distribution server 101 when the PLAY command which designates the reproduction time is received from the video receiving apparatus 100 will be described below.

Due to a difference between the reproduction time measured on the video receiving apparatus 100 side and the reproduction time measured on the video distribution server 101 side, a video stream position recognized on the video receiving apparatus 100 side and the video stream position recognized by the video distribution server 101 may be different from each other. Further, in general, the video stream position recognized by the video distribution server 101 is not directly employed as a reproduction start position, and a stream position which is suitable to pause and near the video stream position is employed as the reproduction start position. For example, when the video stream is encoded by the MPEG-2 system, a group of pictures (GOP) is present as a random access unit.

Figure 6A:
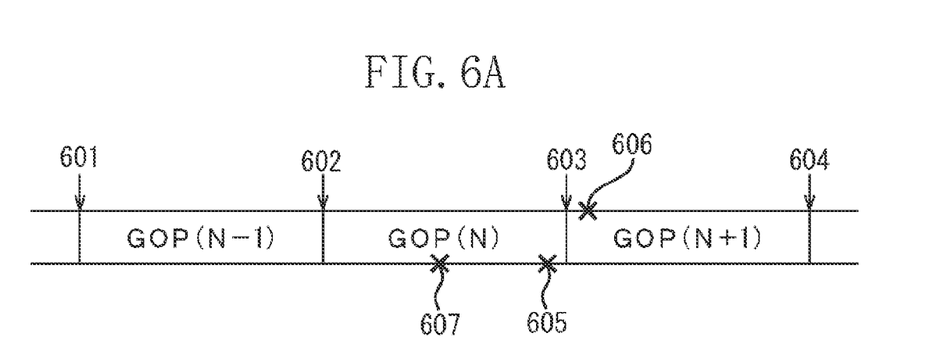
FIGS. 6A and 6B illustrate an example of a reproduction time determining process according to the first exemplary embodiment of the present invention.
Figure 6B:
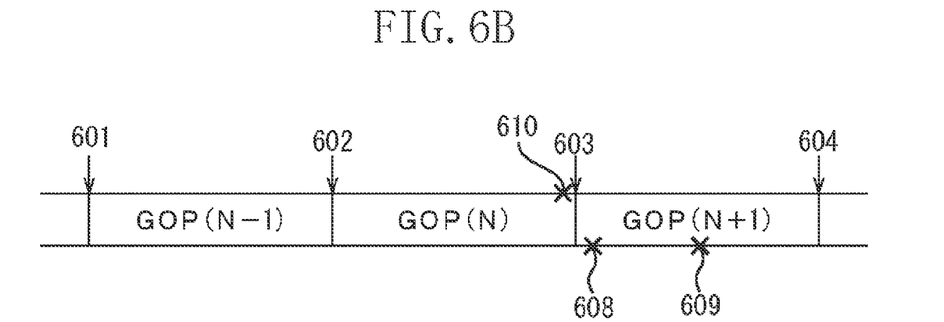

As illustrated in FIGS. 6A and 6B, GOP headers 601 to 604 which are synchronization codes suitable to pause in a video stream are employed as the reproduction start positions. When reproduction time designated by a PLAY command transmitted from the video receiving apparatus 100 indicates a stream position 605, the GOP header 602 of a GOP including the stream position is employed as the reproduction start position.

More specifically, due to the difference between the reproduction time measured on the video receiving apparatus 100 side and the reproduction time measured on the video distribution server 101 side and presence of a reproduction start position determining process on the video distribution server side, the reproduction start position which is not intended by the video receiving apparatus 100 may be employed.

For example, it is assumed that a transmission error occurrence position is a stream position 605. In this case, to a PLAY command which designates the reproduction time corresponding to the stream position 605, the video distribution server 101 may recognize the stream position corresponding to the PLAY command as a stream position 606 due to the difference of the measured reproduction time. When such erroneous recognition is performed, the video distribution server 101 may determine not the GOP header 602 but the GOP header 603 as the reproduction start position.

Thus, in the present exemplary embodiment, the reproduction time designated to the video distribution server 101 is determined so that data is reliably retransmitted from a stream position where supply of the data to the video reproducing unit is interrupted. In the example illustrated in FIG. 6A, the stream position 605 where a transmission error occurs is set as a detection position where the occurrence of the error is detected. When the detection position falls within a predetermined range from the GOP header 603 which is a head of the next GOP, reproduction time corresponding to a stream position 607 near a center of a GOP to which the stream position 605 belongs is designated as reproduction start time by the PLAY command.

The reproduction start time is designated as described above to request the video distribution server 101 to transmit data, so that a predetermined margin can be secured for the difference between the pieces of reproduction time measured by the video receiving apparatus 100 and by the video distribution server 101. Therefore, even though the pieces of reproduction time measured by the video receiving apparatus 100 and by the video distribution server 101 are different from each other, the GOP header 602 of the GOP to which the stream position 605 where the transmission error occurs belongs can be set as the reproduction start position.

On the other hand, as illustrated in FIG. 6B, when a stream position 608 where a transmission error occurs falls within a predetermined range from a rear end in a GOP to which the stream position 608 belongs, reproduction time corresponding to a stream position 609 in a center direction of the GOP to which the stream position 608 belongs is designated by the PLAY command. In this manner, the GOP header 603 of the GOP to which the stream position 608 where the transmission error occurs belongs can be set as the reproduction start position. Therefore, it can avoid occurrence of inconvenience in which a stream position corresponding to the PLAY command is recognized as a stream position 610 due to the difference of the measured reproduction time, and unnecessarily preceding GOP header 602 is set as the reproduction start position.

Since a stream reproduced earlier than the stream position where the transmission error occurs is already received, data is redundant when the data is retransmitted. Therefore, the GOP header 602 which is unnecessarily preceded than the stream position where the transmission error occurs is prevented from being set as the reproduction start position, so that supplying of the video stream can be resumed while reducing delay caused by transmission of redundant data.

Figure 7:
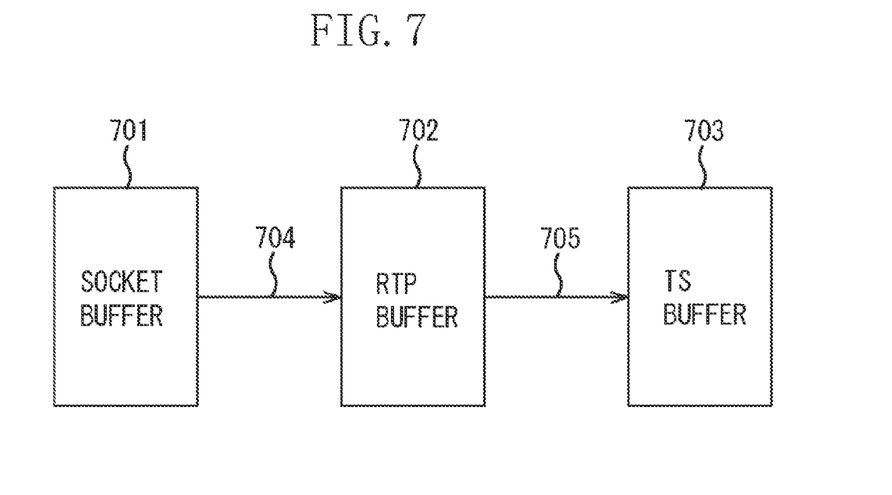
FIG. 7 is a block diagram illustrating a data flow of a video stream of the video receiving unit according to the first exemplary embodiment of the present invention.

FIG. 7 illustrates a data flow of a video stream received in the video receiving unit 103. The video receiving unit 103 includes, as buffers to receive the video stream, a socket buffer 701, an RTP buffer 702, and a TS buffer 703 in the memory unit 203.

The socket buffer 701 stores the video stream received by the network control unit 202 at a UDP packet level. The RTP buffer 702 reads an RTP packet from the UDP packet stored in the socket buffer 701 and stores the RTP packet (data flow 704).

In the data flow 704, it is determined whether packet loss occurs by checking whether sequence numbers of RTP packet headers are in serial order. Further, when the next RTP packet cannot be obtained for a predetermined period, it is determined that packet loss occurs. The lost RTP packet is recovered by the FEC packet described in FIG. 5. When an RTP packet which cannot be recovered even by the FEC packet due to burst packet loss is present, it is determined that an "error is required to be retransmitted".

The TS buffer 703 reads a TS packet from a payload of the RTP packet and stores the TS packet (data flow 705). When it is determined that the "error is required to be retransmitted", interruption position detecting processing, error retransmission processing, and reproduction resume processing are performed.

In the interruption position detecting processing, when packet loss which cannot be recovered by FEC occurs, an interruption position where data supply to the video reproducing unit 104 is interrupted and a positional relationship between the interruption position and a predetermined synchronization code (for example, a GOP header) in a video stream are detected.

In the error retransmission processing, based on the interruption position and the positional relationship detected by the interruption position detecting processing, reproduction time designated to the video distribution server is determined so that data from the interruption position is reliably retransmitted, and a PLAY command which designates the reproduction time is transmitted to the video distribution server 101.

In the reproduction resume processing, the data supply to the video reproducing unit 104 is resumed from the interruption position. Details of the interruption position detecting processing, the error retransmission processing, and the reproduction resume processing will be described below.

The TS packet stored in the TS buffer 703 is read by the video reproducing unit 104. The video stream in the payload of the TS packet read by the video reproducing unit 104 is decoded, and output to the display 105.

Flow control information for writing the TS packet into the TS buffer 703 by the video receiving unit 103 and reading the TS packet from the TS buffer 703 by the video reproducing unit 104 is exchanged via the interface control unit 206.

In the present exemplary embodiment, the video receiving unit 103 permits the video reproducing unit 104 to read data in units of a packetized elementary stream (PES). Therefore, when stream supply to the video reproducing unit 104 is interrupted by a transmission error, the interruption position is a byte next to a last byte in the PES which is finally normally received. The PES is a block of data which substantially corresponds to one video frame, and can be easily handled as a unit to be supplied by the video reproducing unit 104.

When reproduction is started from a head of video contents, the video receiving unit 103 instructs the video reproducing unit 104 to start reproducing after a predetermined amount of the video stream is accumulated in the TS buffer 703. This is because jitter on the network 102 needs to be absorbed.

Therefore, even though a transmission error which cannot be recovered by the FEC occurs, before a read position of the video reproducing unit 104 reaches the error interruption position, the video streams subsequent to the interruption position can be accumulated in the TS buffer 703 by error retransmission.

When the TS buffer 703 causes underflow, the video reproducing unit 104 continuously outputs a video frame immediately before the error interruption position to the display 105 and the video frame enters a freeze state. Also in this case, the video streams subsequent to the error interruption position are supplied to the video reproducing unit 104, and reproduction can be seamlessly resumed from a video frame next to the video frame which is in the freeze state.

Figure 8:
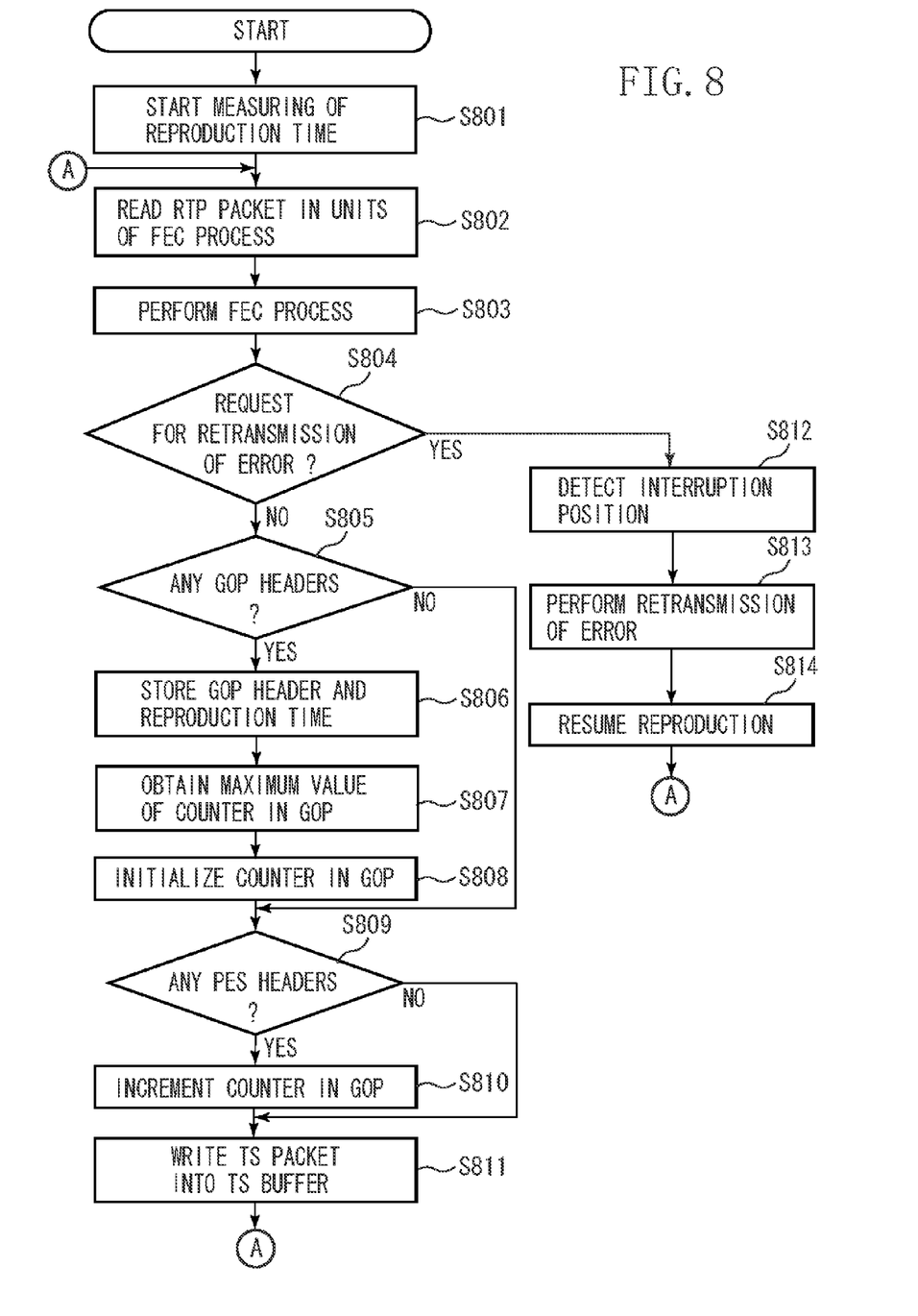
FIG. 8 is a flow chart illustrating an example of a procedure of the video receiving unit according to the first exemplary embodiment of the present invention.

FIG. 8 is a flow chart illustrating an example of the interruption position detecting processing in the video receiving unit 103. The processing illustrated in the flow chart corresponds to the data flow 705 illustrate in FIG. 7. The processing is started in response to the start of accumulation of video streams in the RTP buffer 702.

In step S801, the timer unit 204 starts measuring reproduction time. In step S802, an RTP packet group is read from the RTP buffer 702 by the FEC processing unit. In step S803, the FEC processing described in FIG. 5 is performed to the RTP packet group read in step S802.

In step S804, it is determined whether the "error is required to be retransmitted". When the error retransmission is not required (NO in step S804), the control shifts to step S805. In step S805, it is determined whether any GOP header is present in the RTP packet group read in step S802. When the GOP header is present as a result of the determination (YES in step S805), the control shifts to step S806 to store the GOP header in a working memory 203a of the memory unit 203. Further, at this time, the reproduction time corresponding to the GOP header is stored in the working memory 203a.

In step S807, a maximum value of a counter in the GOP is obtained. The counter in the GOP counts PES headers in the GOP. When the second GOP header is detected, a GOP counter value of the previous GOP is obtained as the maximum value. In step S808, the counter in the GOP is initialized to zero. Then, the control shifts to step S809. In step S805, when it is determined that the GOP header is not present (NO in step S805), the control shifts directly to step S809.

In step S809, it is determined whether any PES header is present in the RTP packet group read in step S802. When the PES header is present as a result of the determination (YES in step S809), the control shifts to step S810 to increment the counter in the GOP header by 1. Then, the control shifts to step S811. When it is determined that the PES header is not present in step S809 (NO in step S809), the control shifts to step S811 without passing through step S810.

In step S811, a TS packet arranged in a payload of the RTP packet group read in step S802 is written into the TS buffer. In this case, all TS packets need not be analyzed to detect the GOP header in step S805 and to detect the PES header in step S809. More specifically, only a video TS packet which is discriminated by a packet ID may be analyzed. Further, a video TS packet whose value of a payload unit start indicator that is present in a header of the TS packet is "1" and its peripheral video TS packets may be analyzed.

On the other hand, when it is determined that the "error is required to be retransmitted" in step S804 (YES in step S804), steps S812 to S814 are performed.

In step S812, the last GOP header stored in step S806 is detected, and the error interruption position is detected from a current value of the counter in the GOP. More specifically, the GOP in the video stream is specified by a time code in the GOP header which is lastly stored, and which PES of the GOP is specified as the error interruption position by the counter in the GOP. At this time, the video reproducing unit 104 is instructed not to read the PES specified as the error interruption position and the subsequent PES.

In step S813, based on the value of the counter in the GOP that is the error interruption position specified in step S812 and the maximum value of the counter in the GOP obtained in step S807, a positional relationship between the error interruption position and the GOP header is recognized. In this manner, the reproduction time to be designated to the video distribution server 101 is determined.

The error interruption position in the GOP is recognized based on the counter value and the maximum value of the counter in the GOP. For example, when the maximum value of the counter in the GOP and the value the counter in the GOP are "15" and "1", respectively, it is determined that the error interruption position is near the GOP header of the GOP to which the error interruption position belongs. When the maximum value of the counter in the GOP and the value of the counter in the GOP are both "15", it can be determined that the error interruption position is near a GOP header of a GOP next to the GOP to which the error interruption position belongs.

In this manner, after the positional relationship between the error interruption position and the GOP header is recognized, the reproduction time corresponding to a position near the center of the GOP described with reference to FIGS. 6A and 6B is designated by the PLAY command. As the reproduction time corresponding to the position near the center of the GOP, a value which is a half of the reproduction time of one GOP may be added to the reproduction time corresponding to the GOP header stored in step S806. The PLAY command which designates the reproduction time and is determined by the above processing is transmitted to the video distribution server 101.

In step S814, from the video stream which is resumed being transmitted from the video distribution server 101 according to the error retransmission processing in step S813, data subsequent to the error interruption position designated in step S812 is written into the TS buffer 703. After the PES specified as the error interruption position in step S812 is accumulated in the TS buffer 703, the video reproducing unit 104 is instructed to resume reading of the PES.

In order to specify the error interruption position from the video stream, a stream position of the PES header may be specified in the GOP header which is specified in step S812 and the counter in the GOP. Subsequently, receiving and reproducing of the video stream are resumed. After the processing in step S811 or S814, the control returns to step S802 to repeat the above processing.

As described above, according to the first exemplary embodiment, in a video distribution service which does not have a retransmission function, automatic retransmission of a transmission error which cannot be recovered by an error correction process can be realized.

In the first exemplary embodiment described above, the GOP header is described as an example of a synchronization code used in a process for determining reproduction time which is designated in error retransmission. However, as a second exemplary embodiment, in addition to the GOP header, the following may be used as the synchronization code.

A sequence header is a synchronization code of control information for designating information required for reproduction such as a screen format, and is inserted at every predetermined timing of the video stream. A PES header of an I picture can be independently decoded, so that the PES header may be set as a reproduction start position in special reproduction.

Since first several B pictures do not depend on a previous GOP, a closed GOP may be set as a reproduction start position by the video distribution server 101. A video stream encoded by the H.264 encoding system includes a plurality of synchronization codes. One synchronization code is an instantaneous decoder refresh (IDR) picture. The other synchronization code is recovery point supplemental enhancement information (SEI). These synchronization codes are synchronization points to cope with random access, and may be set as a reproduction start position by the video distribution server 101.

In this manner, when the synchronization code which may be used as the reproduction start position by the video distribution server 101 is used in the process for determining the reproduction time which is designated in the error retransmission, the video receiving apparatus can cope with various video distribution servers.

The second exemplary embodiment describes that a synchronization code which may be used as reproduction start position by the video distribution server 101 is used in a process for determining reproduction time which is designated in error retransmission.

Which synchronization code is used as a reproduction start point by the video distribution server 101 may be automatically detected for each video distribution server. More specifically, after a PLAY command which designates reproduction time is transmitted to the video distribution server 101, a synchronization code which appears first in a first received video TS packet is stored as history information for each of the video distribution servers 101. When pieces of the history information which are previously stored are concentrated on a specific synchronization code, it is determined that the video distribution server uses the specific synchronization code as the reproduction start position.

Embodiments according to the present invention can be applied to, for example, a system, an apparatus, a method, a program, or a recording medium. More specifically, the present invention may be applied to a system including a plurality of devices or an apparatus configured by one device.

The units which configure the video receiving apparatus according to the exemplary embodiments of the present invention are hardware components. Functions of the video receiving apparatus are achieved by the units of the video receiving apparatus executing programs stored in a random access memory (RAM) or a read only memory (ROM) in a computer. The programs and a computer readable recording medium on which the programs are recorded are included in the present invention.

According to the present invention, the programs are directly or remotely supplied to a system or an apparatus. The present invention may be achieved by a computer of the system or the apparatus reading and executing the supplied program code.

Therefore, a program code itself installed in a computer to cause the computer to implement the functional processes of the present invention realizes the present invention. More specifically, the present invention includes the computer program itself to realize the functional processes according to the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-195433 filed Jul. 29, 2008, which is hereby incorporated by reference herein in its entirety.

What is claimed is:

1. A video receiving apparatus comprising:
a receiving unit configured to receive a video stream transmitted from a video distribution apparatus and to be reproduced by a video reproducing unit;
a detecting unit configured to detect an error occurrence position on the video stream in response to an error occurring during receiving of the video stream;
a determining unit configured to determine a reproduction start time based on the error occurrence position detected by the detecting unit and a position of a predetermined synchronization code in the video stream so that reproduction of the video stream is started before the error occurrence position; and
a control unit configured to transmit a reproduction request including the determined reproduction start time to the video distribution apparatus.

2. The video receiving apparatus according to claim 1, wherein the receiving unit receives the video stream in response to the reproduction request, and
the control unit resumes supplying the video stream received by the receiving unit in response to the reproduction request from the error occurrence position to the video reproducing unit.

3. The video receiving apparatus according to claim 2, wherein the control unit resumes supplying the video stream from the error occurrence position via a buffer.

4. The video receiving apparatus according to claim 1, wherein the error occurrence position is specified by information for specifying each video frame in the video stream.

5. The video receiving apparatus according to claim 1, wherein the predetermined synchronization code is a group of pictures (GOP) header indicating a start of a GOP.

6. The video receiving apparatus according to claim 1, wherein in response to the error occurrence position in a group of pictures (GOP) falling within a predetermined range from a rear end of the GOP, the determining unit determines the reproduction start time with a margin in a direction from the error occurrence position to a center of the GOP.

7. The video receiving apparatus according to claim 1, wherein in response to the error occurrence position in a group of pictures (GOP) falling within a predetermined range from a head of the GOP, the determining unit determines the reproduction start time with a margin in a direction from the error occurrence position to a center of the GOP.

8. The video receiving apparatus according to claim 1, wherein the predetermined synchronization code is a synchronization code indicating a start of any one of a sequence header, an I picture, an instantaneous decoder refresh (IDR) picture, and recovery point supplemental enhancement information (SEI).

9. The video receiving apparatus according to claim 1, wherein the determining unit determines the reproduction start time based on a predetermined synchronization code which appears first in a video stream previously requested by the control unit.

10. A method for receiving a video, the method comprising:
receiving a video stream transmitted from a video distribution apparatus and to be reproduced by a video reproducing unit;
detecting an error occurrence position on the video stream in response to an error occurring during receiving of the video stream;
determining a reproduction start time based on the detected error occurrence position and a position of a predetermined synchronization code in the video stream so that reproduction of the video stream is started before the error occurrence position; and
transmitting a reproduction request including the determined reproduction start time to the video distribution apparatus.

11. A non-transitory computer readable storage medium storing a computer program that causes a computer to perform the method according to claim 10.

* * * * *